United States Patent [19]

Schave

[11] 4,298,281
[45] Nov. 3, 1981

[54] LASER SYSTEM FOR ALIGNING CONVEYOR ROLLS

[75] Inventor: Richard D. Schave, Perrysburg, Ohio

[73] Assignee: Libbey-Owens-Ford Company, Toledo, Ohio

[21] Appl. No.: 57,905

[22] Filed: Jul. 16, 1979

[51] Int. Cl.$^3$ .............................................. G01B 11/27
[52] U.S. Cl. ..................................... 356/138; 356/153
[58] Field of Search ....................... 356/138, 152–154, 356/155; 250/231 SE

[56] References Cited

U.S. PATENT DOCUMENTS 2,915,940  12/1959  Thomas et al. ...................... 356/154
3,552,859  1/1971   Snyder ................................ 356/138
3,902,810  9/1975   Hamar ................................ 356/138

FOREIGN PATENT DOCUMENTS

13554/70  10/1971  Australia .............................. 356/153

*Primary Examiner*—William H. Punter
*Attorney, Agent, or Firm*—Collins, Oberlin & Darr

[57] ABSTRACT

An alignment system having a light source for projecting a reference light beam extending longitudinally with and parallel to the centerline of a roller conveyor for establishing a common reference plane containing the axes of a plurality of transversely extending conveyor rolls. Preferably, the light beam is spaced within a specified distance from the ends of the conveyor rolls. The system includes a laser having a beam expander for reducing the divergence of the light beam over long distances, a penta prism for bending the incident light beam at right angles from its projected path and directing the bent light beam against a mirror attached to an end of one of the conveyor rolls. The mirror reflects the beam back to the penta prism which, in turn, directs the reflected beam against a target located at the light source whereat the reflection of the light beam on the target is used for accurately determining the alignment relationship of that particular conveyor roll to the incident light beam.

7 Claims, 6 Drawing Figures

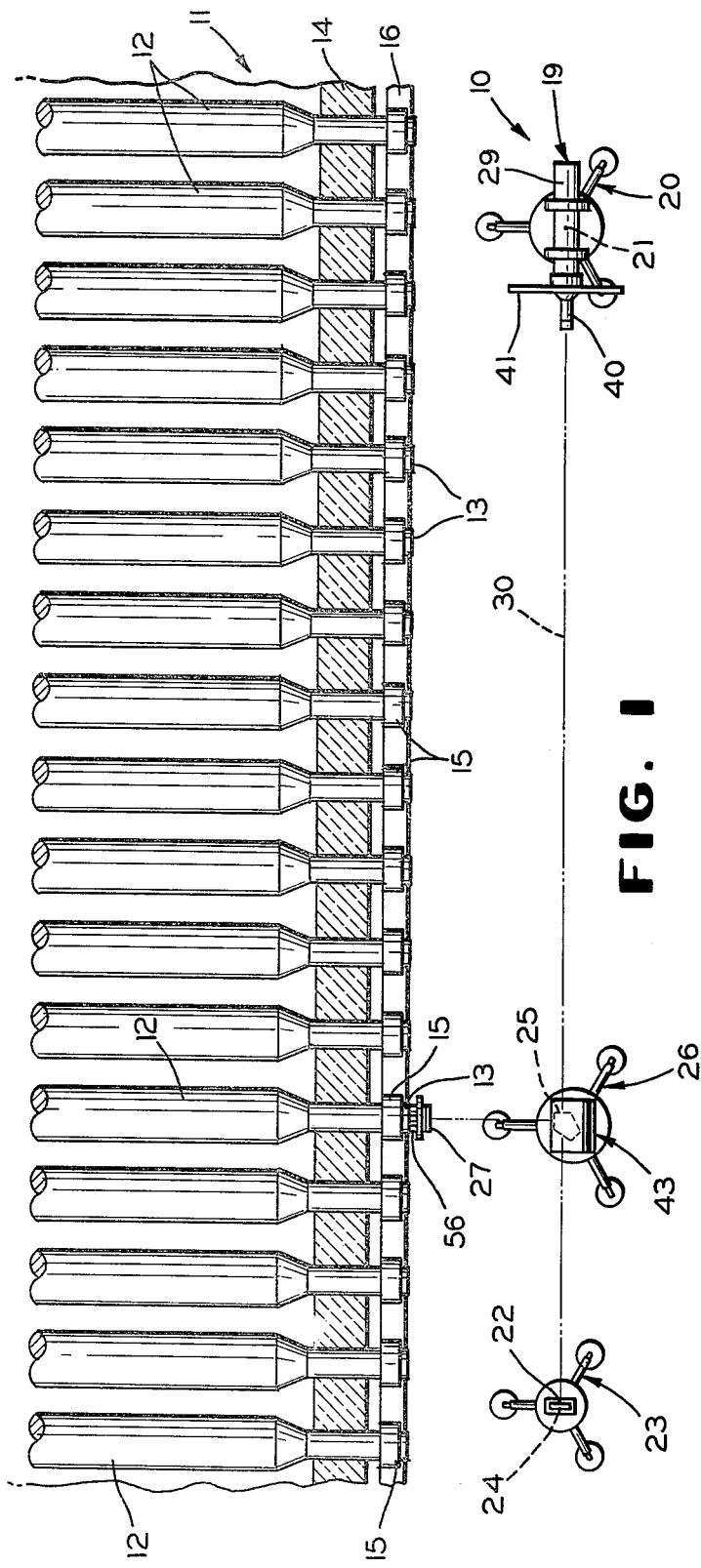
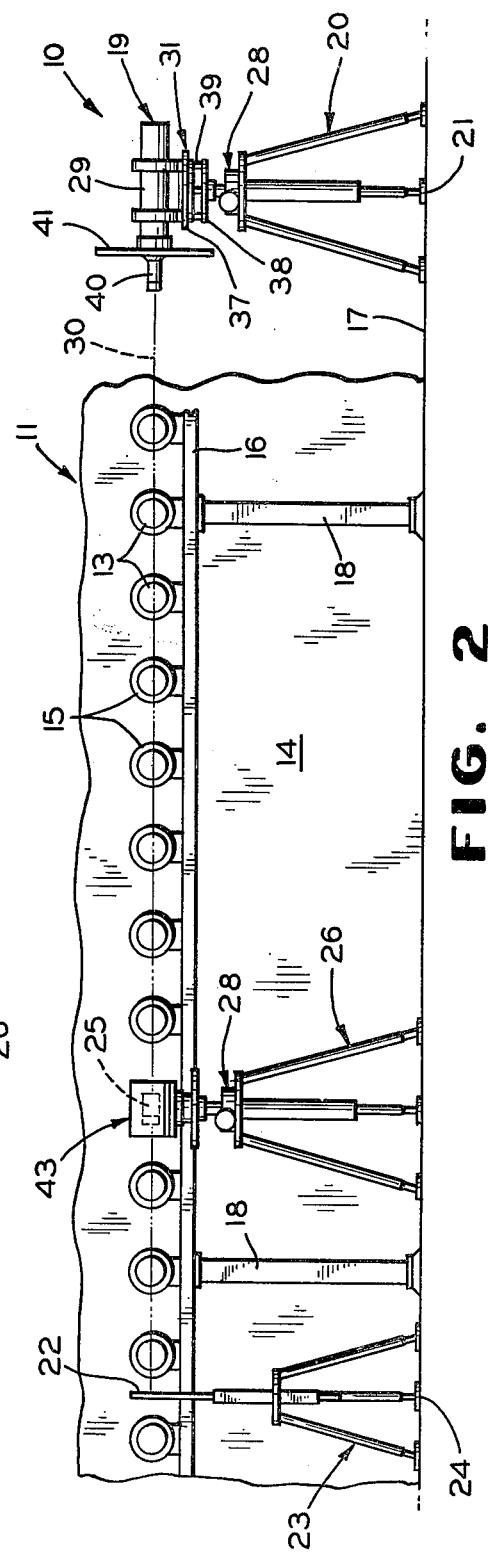

LASER SYSTEM FOR ALIGNING CONVEYOR ROLLS

BACKGROUND OF THE INVENTION

1. Field of the Invention

This invention generally relates to the manufacturing of flat glass, and more particularly to a new and novel system for accurately aligning conveyor rolls employed in the processing of flat glass.

2. Description of the Prior Art

In the manufacture of flat glass, it is customary to produce a continuous ribbon of glass from a molten glass mass by one of the well-known sheet, plate or float glass forming processes, and convey this newly formed ribbon through an annealing lehr. The primary purpose of conveying the newly formed glass ribbon through the lehr is to cool it from the highly heated plastic condition in which it emerges from the forming area to a rigid glass ribbon at approximately ambient temperature while producing a controlled permanent stress pattern therein. In a conventional annealing process, temperatures in the lehr may range from about 1300° F. (704.4° C.) at its entrance end to about 400° F. (204.4° C.) or less at its exit end. The glass ribbon is gradually cooled in accordance with a predetermined pattern from the higher temperature level to the lower temperature level in order to produce a predetermined desired stress pattern in the glass ribbon. Accordingly, the lehrs employed in the production of flat glass may range in length from approximately 430 feet, 131.1 m to 650 feet, 198.1 m and may employ anywhere from two hundred and forty one (241) to three hundred forty six (346) transversely extending, longitudinally spaced conveyor rolls along such lengths.

The conveyor rolls must be properly aligned for preventing damage to the glass ribbon as it is conveyed through the lehr. If the rolls are not properly aligned, that is, if they are skewed relative to each other either in horizontal or vertical directions or combinations thereof, they may cause wrinkling or snaking of, and surface abrasions on, the glass ribbon rendering the glass unfit for commercial use. Also properly aligned rolls help keep the glass ribbon in the center of the lehr as it passes therethrough.

In the past, surveying techniques, including the use of levels, level rods and measuring tapes, have been used for aligning such conveyor rolls. Since the rolls require individual alignment, the utility of surveying techniques as an ultimate tool in aligning them is limited in that the exercise of human judgment is involved in reading and recording. One factor which limits the accuracy of such an alignment system is the setting of the surveying instruments from roll to roll. Another factor limiting the accuracy of such a system is the temperature of the environment surrounding the lehr, which is normally in the neighborhood of 140° F. (60° C.). This temperature, of course, causes the tape to change in length and since the temperature along each side of the lehr may be different the length of the tape will be different.

SUMMARY OF THE INVENTION

Generally, the present invention is directed to a method and apparatus for aligning conveyor rolls in which a light beam is projected longitudinally alongside the conveyor adjacent the ends of the transversely extending, longitudinally spaced rolls thereof for establishing a common reference plane, and the light beam is employed to determine the relationship of individual rolls to the reference plane. The light beam is accurately positioned relative to the conveyor rolls by projecting it between a pair of longitudinally spaced bench marks whose line of sight is in the desired plane of the roll axes and parallel to the longitudinal axis of the conveyor. In other words, the light beam and the axes of the conveyor rolls, when properly aligned, lie in the common reference plane, with the individual roll axes perpendicular to the light beam.

Briefly, the alignment system includes a flat mirror attached to the end of a rotating roll as by a magnetic or spring loaded device, and a penta prism for deflecting the light beam at a right angle, which is set up adjacent the end of the roll having the mirror attached and in the path of the light beam. The light beam is thus deflected to the rotating mirror which reflects it back through the prism to a target located at the source of the light beam. Ideally, the plane of the flat mirror is perpendicular to the axis of the roll so that, when the roll is perfectly aligned, the reflected light beam returns upon itself to the light source. However, it is not necessary that the mirror be absolutely perpendicular to the axis since, if it is not perpendicular, the reflected beam will merely inscribe a circle instead of a point on a target at the light source. The diameter of the inscribed circle will idicate the amount by which the mirror plane deviates from perpendicularly with the roll axis. If desired, the mirror can be adjusted so as to be more nearly perpendicular and thus reduce the diameter of the inscribed circle. In any event, the light source will always be at the center of this circle inscribed due to non-perpendicularity between the mirror and roll axis.

If the axis of the roll itself, however, is not perpendicular to the longitudinal axis of the lehr, and hence also to the light beam, the reflected beam will strike the target at a point displaced from the light source in a direction and at a distance dependent upon the direction of skew of the roll axis. If the mirror is not perpendicular to the roll axis, the reflected beam will inscribe upon the target a circle whose center is displaced from the light source, thereby indicating the direction of skew of the roll axis. The roll journals can then be manipulated to move one or the other ends of the roll in the appropriate direction to properly align the roll.

OBJECTS AND ADVANTAGES

It is therefore an object of the invention to provide an aligning system that is simple, easy to use, and accurate in squaring the axes of rotating conveyor rolls with a reference line that is parallel to the longitudinal axis of the conveyor and lies in a common plane containing the axes of a plurality of longitudinally spaced rolls.

Another object of the invention is to provide an aligning system employing a light beam which, in conjunction with the centerline of a roll conveyor, establishes a common plane containing the axes of the rotating rolls.

Other objects and advantages of the invention will become more apparent during the course of the following description when read in connection with the accompanying drawings.

BRIEF DESCRIPTION OF THE DRAWINGS

In the drawings, wherein like numerals are employed to designate like parts throughout the same:

FIG. 1 is a plan view of a portion of a glass annealing lehr and its conveying system wherein the present invention may be employed;

FIG. 2 is a side elevational view of the lehr and the aligning system illustrated in FIG. 1;

DESCRIPTION OF THE PREFERRED EMBODIMENT

Figure 3:
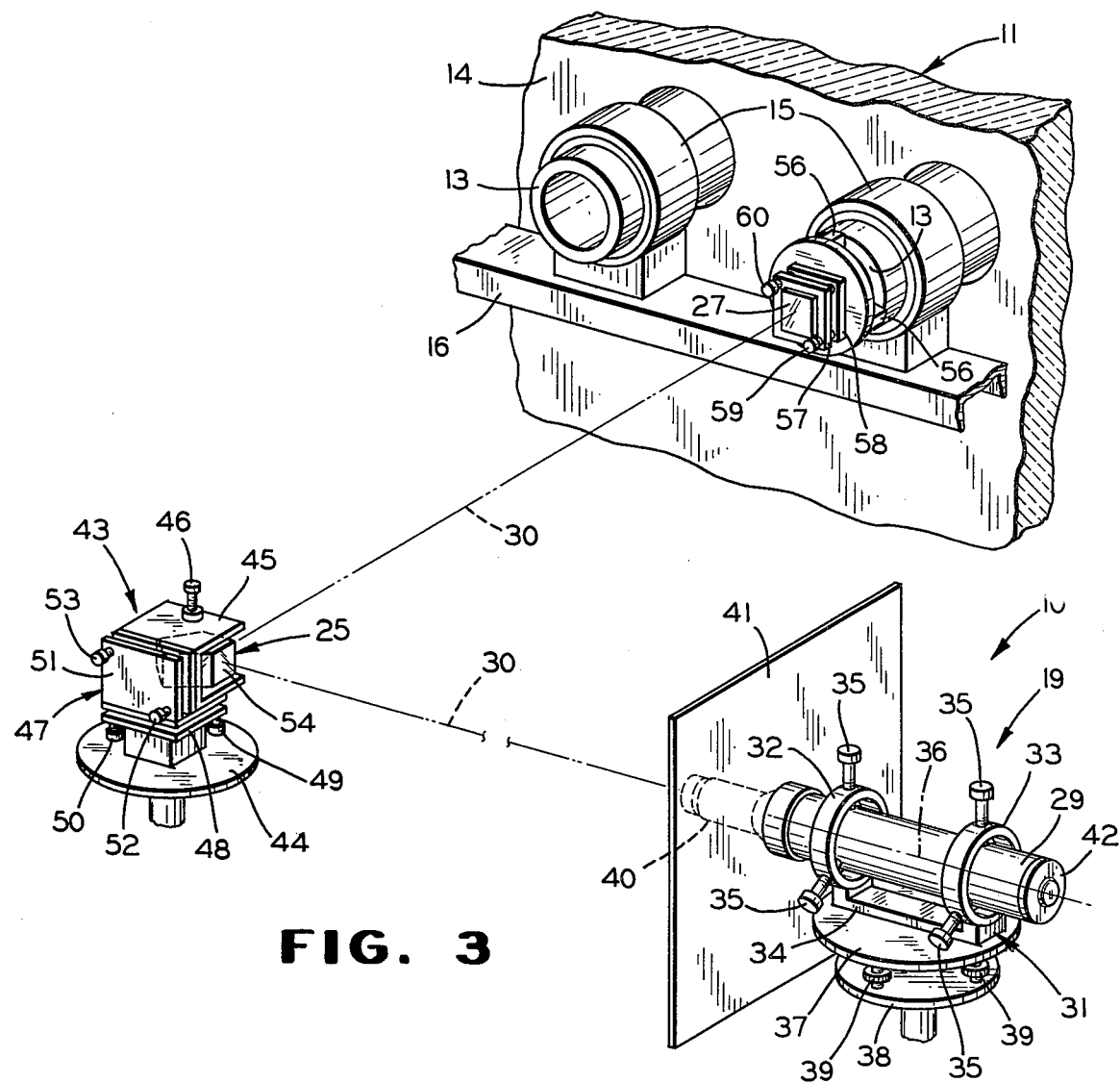
FIG. 3 is an enlarged fragmentary perspective view illustrating the components of the aligning system.

Although the alignment system is designed for use in accurately aligning the conveyor rolls of a glass annealing lehr, it will be appreciated that it may be used in various fields where accurate alignment of machine elements other than conveyor rolls is of utmost importance.

Generally speaking, the alignment system of this invention is composed of a novel arrangement of commercially available components. Referring now to FIGS. 1 and 2, an alignment system, set up in accordance with the invention and designated in its entirety by the reference numeral 10, is illustrated along a portion of an annealing lehr 11 customarily employed in the manufacture of a continuous ribbon of flat glass (not shown). The lehr 11 generally comprises a closed refractory structure (not shown) and a conveying system comprising a plurality of longitudinally spaced, driven conveyor rolls 12 extending transversely of the closed structure for conveying the glass ribbon therethrough. As is well known, one end 13 of each roll 12 projects through a side wall 14 forming part of the closed refractory structure. The ends 13 of each roll are journalled in pillow block bearings 15 mounted on a horizontally disposed rail 16 extending longitudinally along the length of the lehr 11. The rail 16 is supported in spaced relation above the floor 17 on upstanding legs 18.

Preferably, the alignment system according to this invention is set up adjacent the ends 13, which are the idling ends of the conveyor rolls 12, in close proximity to the lehr side wall 14. Briefly, the alignment system 10 includes a source 19 providing a highly collimated beam of light mounted on an adjustable tripod 20 positioned over a first bench mark 21, a sighting point 22 mounted on an adjustable tripod 23 positioned over a second aligned bench mark 24, a penta prism 25 mounted on an adjustable tripod 26, and a flat mirror 27 magnetically attachable to the idling end 13 of the roll 12 which is to be aligned. The tripods 20, 23 and 26 are of conventional construction and each may include an elevating mechanism 28 (see FIG. 2).

Referring now to FIGS. 2 and 3, the light source 19 generally comprises a laser unit 29 which produces an intense, highly collimated beam of light 30. The laser 29 is adjustably mounted on the tripod 20 so that the light beam 30 may be properly oriented with respect to the ends and axes of the conveyor rolls 12. To this end, as best illustrated in FIG. 3, the laser unit 29 is received in a mounting device 31 having a pair of spaced supporting rings 32 and 33 connected together by a web 34. A plurality of screws 35 disposed in the rings 32 and 33 secure the laser 29 within the mounting device 31 for movement about its longitudinal axis 36. The mounting device 31 is fixedly mounted, by suitable means (not shown), on an adjustable plate 37 which in turn is mounted to a top plate 38 by, preferably, three equally spaced leveling screws 39 (only two shown), the top plate 38 constituting part of the tripod 20. The laser unit is provided with a beam expander 40 for keeping the diameter of the light beam 30 small over long distances, that is, at least up to 250 feet (76.2 m). A beam intercepting target plate 41 is provided at one end of the laser unit 29 adjacent the beam expander 40 for intercepting a reflected beam 30a. A weight 42 (see FIG. 3) is provided at the end of the laser unit 29 opposite the target plate 41 for counterbalancing the weight of the target plate 41.

Referring now to FIGS. 1 and 2, the lehr rolls are generally driven at one of their ends, and the light beam 30 is preferably directed along the opposite, or idling, side of the lehr 11 and at a distance of about 3 (0.9144 m) to 4 (1.2192 m) feet away from the ends 13 of the conveyor rolls 12, using the bench marks 21 and 24 as references. The bench marks 21 and 24 are a known distance away from the centerline of the lehr 11 and provide a reference line which is parallel thereto.

With the bench mark 21 at the proper distance away from the ends of the lehr rolls 12, the laser unit 29 is positioned by the tripod 20 thereover. Once the centering and leveling of the tripod is completed, the elevation of the laser light beam 30 is set by the elevating mechanism 28 of the tripod 20 to the same elevation as the desired centerline of the conveyor rolls 12.

The sighting point 22 (see FIG. 2) is established some distance, that is, anywhere from 100 (30.48 m) to 250 (76.2 m) feet (depending upon the distance between the bench marks 21 and 24) away from the laser unit 29 in order to aim the light beam 30 parallel to the centerline of the lehr. To this end, the tripod 23 is set up in the same relative position as the previously described tripod 20 but with reference to the bench mark 24. Thus, the sighting point 22 will be located at the same distance from the ends 13 of the rolls 12 and its elevation will be set to be the same as the elevation of the laser unit 29. The laser unit 29 is then aimed at the sighting point 22 by manipulating the micrometer mounting screws 35 provided on the supporting rings 32 and 33 of the mounting device 31. Of course, the aforedescribed steps must be carefully performed in obtaining accurate alignment of the conveyor rolls 12.

Referring now to FIG. 3, the penta prism 25 is secured in an adjustable holder, designated in its entirety by the reference numeral 43, which is suitably secured to the top plate 44 of the conventionally constructed tripod 26. As there shown, the holder 43 generally comprises a U-shaped member 45 which is provided with a prism hold down screw 46 for securing the prism 25 therein. The U-shaped member 45 is adjustably mounted in an angle bracket 47 for movement about both its vertical and horizontal axes. To this end, the base 48 of the angle bracket 47 is provided with a pair of diagonally opposed adjusting screws 49 and 50 for rotational adjustment movement of the U-shaped member 45 about a horizontal axis, and upright leg 51 is provided with a pair of diagonally opposed adjusting screws 52 and 53 for rotational adjustment movement of the member 45 about its vertical axis. The holder 43 is a commercially available device and, since it per se forms no part of the invention, further description is not deemed necessary.

Referring now to FIGS. 1 and 2, the tripod 26 supporting the penta prism 25 is placed into the alignment system so that the light beam 30 coming from the laser unit 29 is approximately centered on its surface 54 facing the laser unit 29. To this end, the tripod 26 may be slid sideways, that is, toward or away from the ends 13 of the rolls 12, so that the beam 30 strikes approximately at the vertical centerline of the prism surface 54. Of course, manipulation of the tripod's elevating mechanism 28 will position the prism surface 54 so that the light beam 30 will strike approximately at its horizontal centerline. Preferably, the prism surface 54 of the penta prism 25 should be approximately perpendicular to the light beam 30 and is perpendicular thereto when the reflection of the beam 30 from the surface 54 is at the center of the target 41. As best illustrated in FIG. 3, the adjusting screw 50 provides a rotational adjustment movement about the vertical axis and the adjusting screw 52 provides a rotational adjustment movement about the horizontal axis of the penta prism for finely setting the surface 54 thereof perpendicularly to the incident light beam 30.

Figure 4:
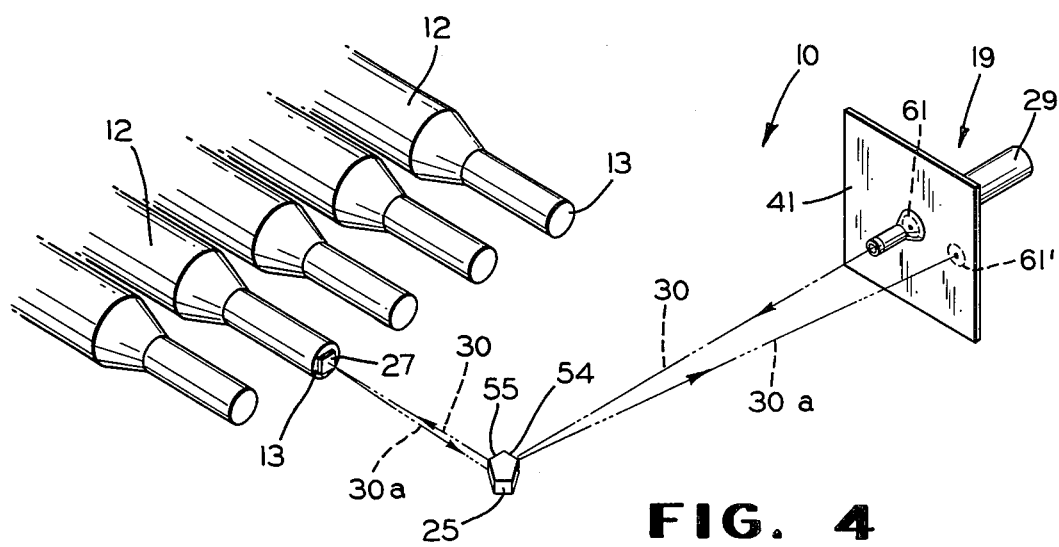
FIG. 4 is a fragmentary perspective view similar to FIG. 3 but diagrammatically illustrating the path of the incident light beam and the path of the reflected light beam.

The bent leg 30' of the beam portion emerging from another surface 55 (see FIG. 4) of the prism 25 toward the mirror 27 is approximately centered horizontally on the mirror 27 by sliding the tripod 26 toward or away from the laser unit 29. Also, the beam 30' emerging from the prism surface 55 towards the end 13 of the roll 12 may be approximately centered vertically on the mirror 27 by manipulating the adjusting screw 53.

Referring now to FIGS. 1 and 3, the first mirror 27 is magnetically mounted on the end 13 of the conveyor roll 12 by three magnets 56 (only two shown). As best illustrated in FIG. 3, the mirror 27 is carried by a flat plate 57 adjustably mounted on a plate 58 carrying the magnets 56. Diagonally disposed adjusting screws 59 and 60 attach the plate 57 to the plate 58 and also adjusts the plane of the mirror 27.

When the plane of the mirror 27 on the end 13 of the roll 12 is not perpendicular to the axis of roll rotation, the light beam 30a reflecting off the mirror 27 will draw a circle as the roll 12 rotates. To adjust the squareness of the mirror 27, the reflection from the mirror 27 directed towards the penta prism 25 is observed to see if it draws a circle around the prism, is above or below the prism, or is going through the prism. If the reflected beam 30a is drawing a circle around the penta prism 25, the two adjusting screws 59 and 60 on the magnetic mirror mount are adjusted until the size of the circular pattern is as small as possible. If the reflected beam 30a is above or below the prism, the adjusting screw 53 on the prism holder 43 is adjusted. When the beam 30a goes through the penta prism 25 from the mirror 27 (see FIG. 4), the adjusting screw 53 on the prism holder 43 is manipulated until the beam is on the upper half of the target 41. By readjusting the adjusting screws 59 and 60 on the magnetic mirror mount, the circular pattern size of the beam of the target 41 may be reduced.

In summary, the laser light source 19 is set up at the bench mark 21 at one end of the lehr 11 and its incident light beam 30 is aligned with the bench mark 24 at the opposite end of the lehr or with an intermediate bench mark (not shown). The penta prism 25 is set up adjacent the end 13 of a roll 12 having the mirror 27 attached and in the path of the light beam 30. The beam is thus diverted to the rotating mirror 27 which reflects it back as the reflected beam 30a through the prism 25 to the light source 19. Ideally, the plane of the flat mirror 27 is perpendicular to the longitudinal axis of the roll 12 so that, assuming the roll is properly aligned, the reflected light beam 30a would return upon the incident beam 30 to the laser light source. However, it is not necessary that the mirror 27 be absolutely perpendicular to the axis of the roll 12 since, if it is not perpendicular, the reflected beam 30a will inscribe a circle 61 instead of a point on the target 41 at the light source 19, with the incident beam 30 at its center. The diameter of the inscribed circle indicates the amount by which the mirror plane deviates from perpendicularity with the roll axis. If desired, the mirror 27 can be adjusted so as to be more nearly perpendicular and thus reduce the diameter of the inscribed circle. In any event, if the axis of the roll is in the horizontal plane of, and perpendicular to, the beam 30, the incident light beam 30 of the light source 19 will always be at the center of this inscribed circle. However, if the roll 12 is not properly aligned, the reflected light beam 30a will impinge at a point or inscribe a circle 61' (FIG. 4) on the target 41 having its center displaced from the light source.

Figure 5:
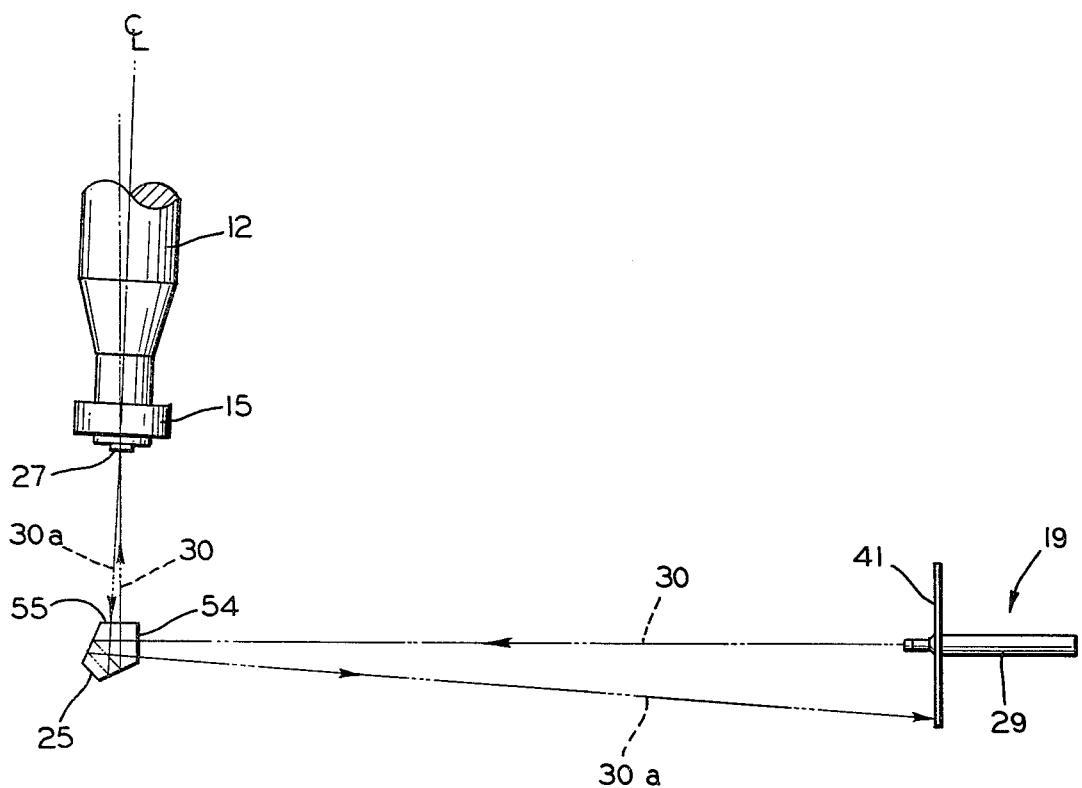
FIG. 5 is a diagrammatic view illustrating the path of the reflected light beam when the axis of the roll is skewed in one direction from the longitudinal centerline of the lehr.
Figure 6:
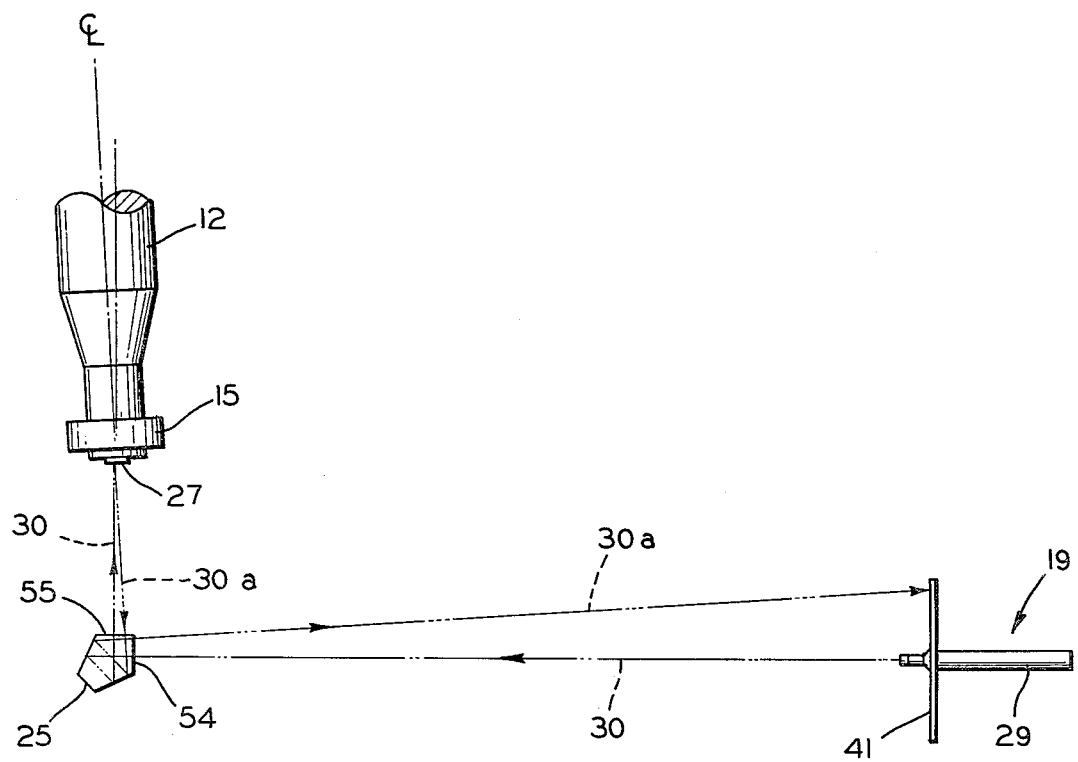
FIG. 6 is a diagrammatic view similar to FIG. 5 but illustrating a roll skewed in the opposite direction from the direction illustrated in FIG. 5.

As illustrated in FIGS. 5 and 6, if the axis of the roll 12 itself is not in the horizontal plane of, and perpendicular to, the longitudinal centerline of the lehr 11 and the incident light beam 30, however, rotation of the roll 12 will cause the reflected beam 30a to be displaced from the light source on the target 41 in a direction dependent upon the direction of skew of the axis of the roll 12. Of course, if the mirror 27 is not perpendicular to the axis of the roll, the reflected beam will inscribe a circle upon the target whose center will be displaced from the light source in an amount and direction indicative of the skew of the axis. The roll journals 15 can then be manipulated, as is conventionally provided for in their construction to move one or the other ends of the roll 12 in the appropriate direction, either vertically or horizontally, to properly align the roll.

From the foregoing discussion, it may be seen that the system 10 provides a precise method of squaring the rolls 12 with the centerline of the lehr 11 with minimal error. The main source of potential error is in the initial set up of the laser unit 29 with the bench marks 21 and 24, and any such error will become apparent after a few observations. More importantly, there will be no cumulative errors which are normally associated with conventional surveying equipment and tape measures. Accordingly, this alignment system minimizes the problems caused by roll misalignment during the production of flat glass ribbons.

It is to be understood that the form of the invention herewith shown and described is to be taken as an illustrative embodiment only of the same and that various changes in the shape, size and arrangement of parts, as well as various procedural changes, may be resorted to without departing fom the spirit of the invention.

I claim:

1. A method of aligning each of a plurality of transversely extending, longitudinally spaced rotating conveyor rolls comprising the steps of:
   (a) establishing a longitudinally extending reference plane containing the axes of the conveyor rolls:
   (b) producing an incident light beam extending longitudinally along a path in said reference plane in parallel relationship to the centerline of the conveyor;

(c) first bending said incident light beam at right anges toward the end of one of said conveyor rolls;

(d) reflecting said light beam from a plane substantially perpendicular to the longitudinal axis of said one rotating conveyor roll on the end of said roll and rotating therewith back to the source of said incident light beam; and (e) intercepting said reflected light beam on a target located at and surrounding said source and observing the angular relationship of said roll axis with said incident light beam from the position of impingement of said reflected beam on said target relative to said source.

2. An alignment system for aligning a plurality of transversely extending, longitudinally spaced conveyor rolls of a conveyor relative to each other, the system comprising:

(a) a light source producing a collimated incident beam of light;

(b) means for directing said incident light beam alongside the conveyor adjacent to the ends of the conveyor rolls and parallel to the center line of said conveyor;

(c) means for bending the incident light beam at substantially right angles from the path thereof toward the adjacent end of one conveyor roll;

(d) means on said end of said one rotating roll comprising a mirror substantially perpendicular to the axis of said roll and rotating therewith for reflecting the light beam back through said bending means to the source of the incident light beam; and (e) target means at and surrounding the light source for intercepting the reflected light beam whereby said reflected beam inscribes a point or circle upon said target means for determining from the position of said point or circle relative to said light source the relationship of the one conveyor roll with the incident light beam.

3. An alignment system for aligning a plurality of conveyor rolls relative to each other as claimed in claim 2 wherein said light source comprises a laser unit and includes a beam expander.

4. An alignment system for aligning a plurality of conveyor rolls relative to each other as claimed in claim 3 wherein said means for directing said light beam includes a remotely spaced sighting point and said laser unit is oriented with said sighting point.

5. An alignment system for aligning a plurality of conveyor rolls relative to each other as claimed in claim 2 wherein said means for bending the incident light beam at substantially right angles comprises a penta prism disposed in the path of the incident light beam.

6. An alignment system for aligning a plurality of conveyor rolls relative to each other as claimed in claim 5 wherein said reflecting means comprises a flat mirror detachably mounted on the end of one conveyor roll, said mirror directing the reflected light beam back to said penta prism.

7. A method of aligning each of a plurality of transversely extending, longitudinally spaced rotating conveyor rolls comprising the steps of:

(a) establishing a longitudinally extending reference plane containing the axes of the conveyor rolls;

(b) producing an incident light beam extending longitudinally along a path in said reference plane in parallel relationship to the centerline of the conveyor;

(c) first bending said incident light beam at right angles toward the end of one of said conveyor rolls;

(d) reflecting said light beam from a plane substantially perpendicular to the longitudinal axis of said one rotating conveyor roll on the end of said roll back to the source of said incident light beam;

(e) intercepting said reflected light beam on a target at said source and observing the angular relationship of said roll axis with said incident light beam from the position of impingement of said reflected beam on said target relative to said source; and (f) adjusting the ends of said one conveyor roll so that said reflected light beam inscribes a point or circle upon said target whose center is coincident with said source.

* * * * *

UNITED STATES PATENT AND TRADEMARK OFFICE
CERTIFICATE OF CORRECTION

PATENT NO. : 4,298,281

DATED : November 3, 1981

INVENTOR(S) : Richard D. Schave

It is certified that error appears in the above-identified patent and that said Letters Patent are hereby corrected as shown below:

Col. 5, line 27, should read --The bent leg portion of the beam 30 emerging from--

Col. 5, line 35, "first" should be --flat--

Signed and Sealed this

Ninth Day of March 1982

[SEAL]

Attest:

Attesting Officer

GERALD J. MOSSINGHOFF

Commissioner of Patents and Trademarks